P. LAMBERTI.
CHECK CONTROLLED STAMPING MACHINE.
APPLICATION FILED MAR. 29, 1910.
1,000,613.
Patented Aug. 15, 1911.
5 SHEETS—SHEET 1.
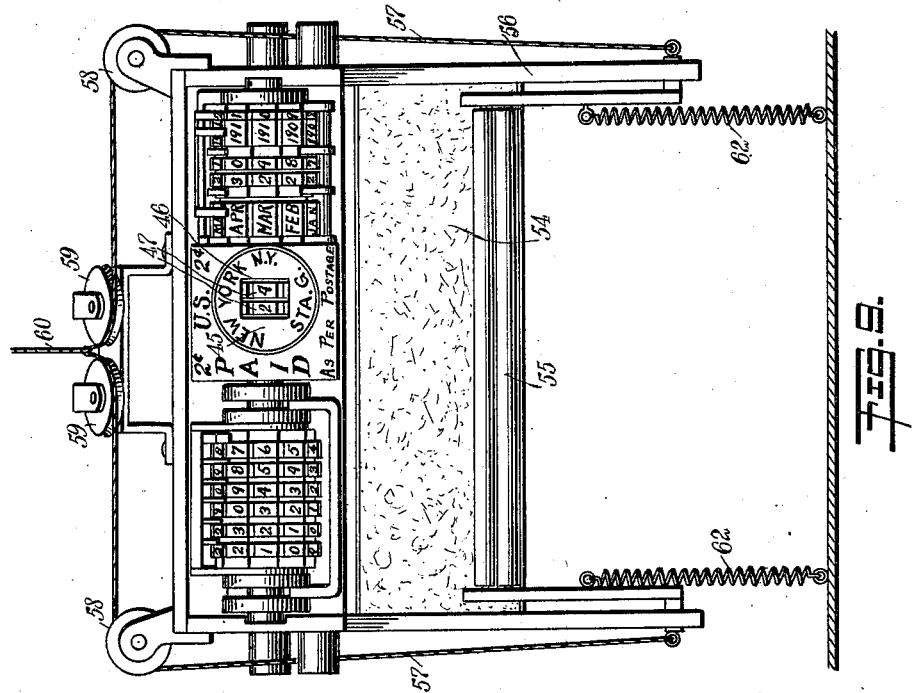
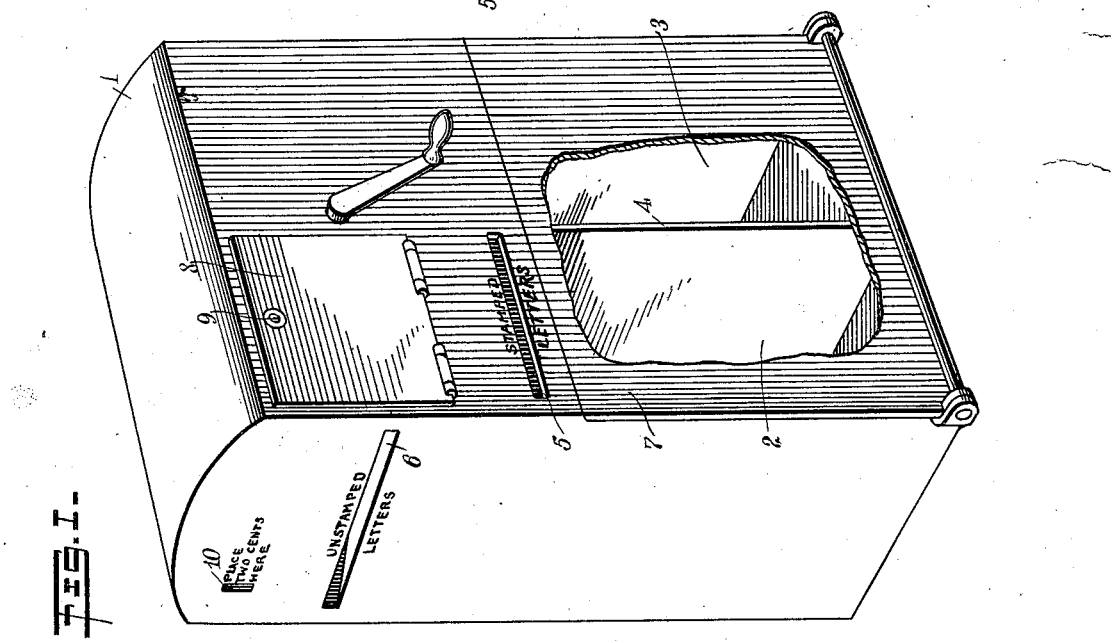
WITNESSES:
G. Robert Thomas
H. Whiting
INVENTOR
Peter Lamberti
BY
ATTORNEYS

P. LAMBERTI.
CHECK CONTROLLED STAMPING MACHINE.
APPLICATION FILED MAR. 29, 1910.

1,000,613.

Patented Aug. 15, 1911.
5 SHEETS—SHEET 2.

WITNESSES:
G. Robert Thomas
H. Whiting

INVENTOR
Peter Lamberti
BY
ATTORNEYS

P. LAMBERTI.
CHECK CONTROLLED STAMPING MACHINE.
APPLICATION FILED MAR. 29, 1910.

1,000,613.

Patented Aug. 15, 1911.

5 SHEETS—SHEET 3.

WITNESSES:
G. Robat Thomas
H. Whiting

INVENTOR
Peter Lamberti
BY
ATTORNEYS

P. LAMBERTI.
CHECK CONTROLLED STAMPING MACHINE.
APPLICATION FILED MAR. 29, 1910.

1,000,613.

Patented Aug. 15, 1911.
5 SHEETS—SHEET 4.

WITNESSES:
G. Robert Thomas
N. Whiting

INVENTOR
Peter Lamberti
BY
ATTORNEYS

P. LAMBERTI.
CHECK CONTROLLED STAMPING MACHINE.
APPLICATION FILED MAR. 29, 1910.
1,000,613.
Patented Aug. 15, 1911.
5 SHEETS—SHEET 5.
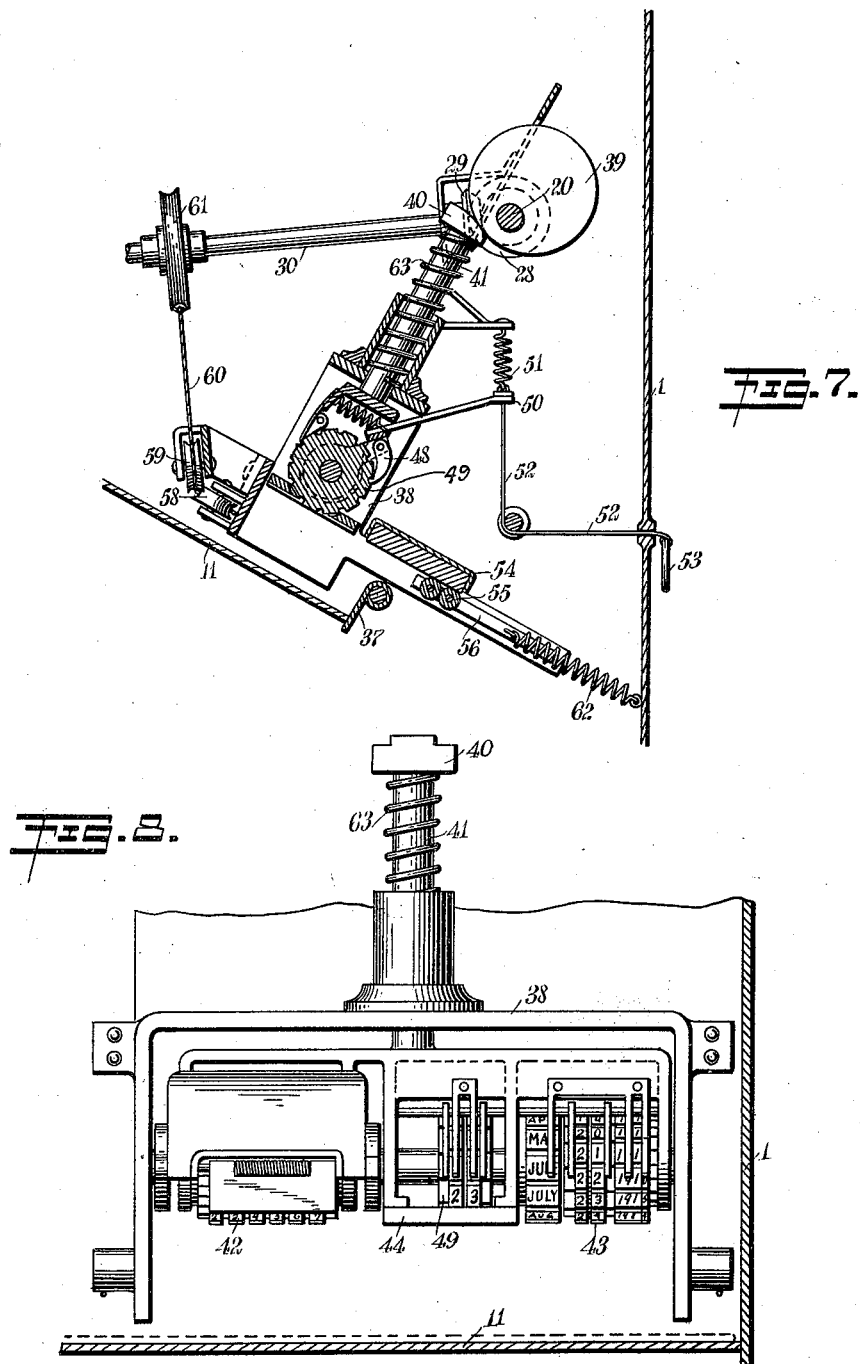
WITNESSES:
INVENTOR
Peter Lamberti
BY
ATTORNEYS

UNITED STATES PATENT OFFICE.

PETER LAMBERTI, OF NEW YORK, N. Y.

CHECK-CONTROLLED STAMPING-MACHINE.

1,000,613.

Specification of Letters Patent. Patented Aug. 15, 1911.

Application filed March 29, 1910. Serial No. 552,146.

*To all whom it may concern:*

Be it known that I, PETER LAMBERTI, a subject of the King of Italy, and a resident of the city of New York, borough of the Bronx, in the county and State of New York, have invented a new and Improved Check - Controlled Stamping - Machine, of which the following is a full, clear, and exact description.

This invention relates to a check-controlled apparatus for stamping articles, such as mail matter.

An object of this invention is to provide a device which will, on the insertion of the proper amount of change, impress on an article of mail matter, a serial number, the hour and date of mailing, the station or box mailed at, and an inscription stating that the required amount of postage has been paid; whereby a great saving in the handling of letters, and the number of clerks necessary to sell stamps, will be accomplished, and further, whereby any pilfering of the postage money or of the letters themselves will be immediately detected.

A further object of this invention is to provide a device which will be simple in construction, inexpensive to manufacture, strong, durable, and positive in its operation.

These and further objects, together with the construction and combination of parts, will be more fully described hereinafter and particularly set forth in the claims.

Reference is to be had to the accompanying drawings forming a part of this specification, in which similar characters of reference indicate corresponding parts in all the views, and in which—

Figure 2:
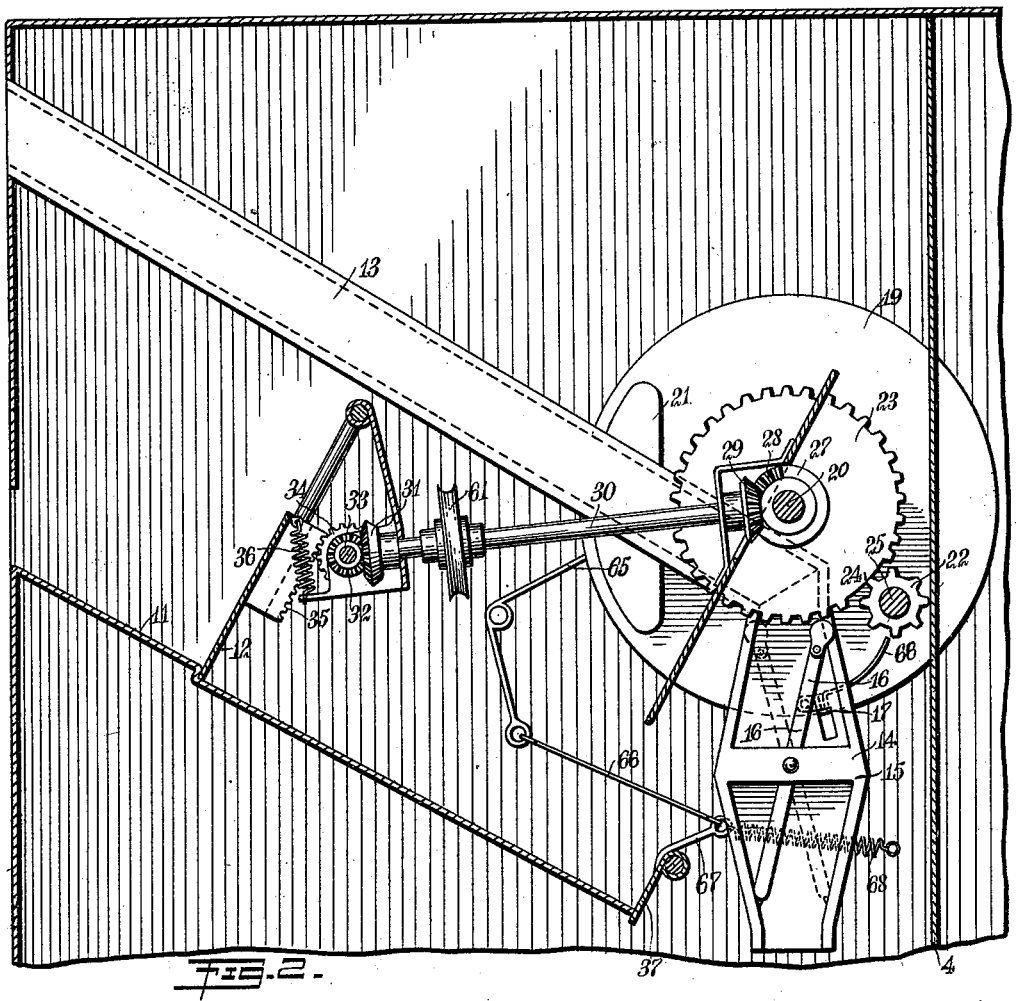
Figure 10:
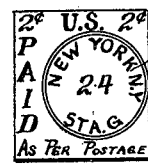
Figure 3:
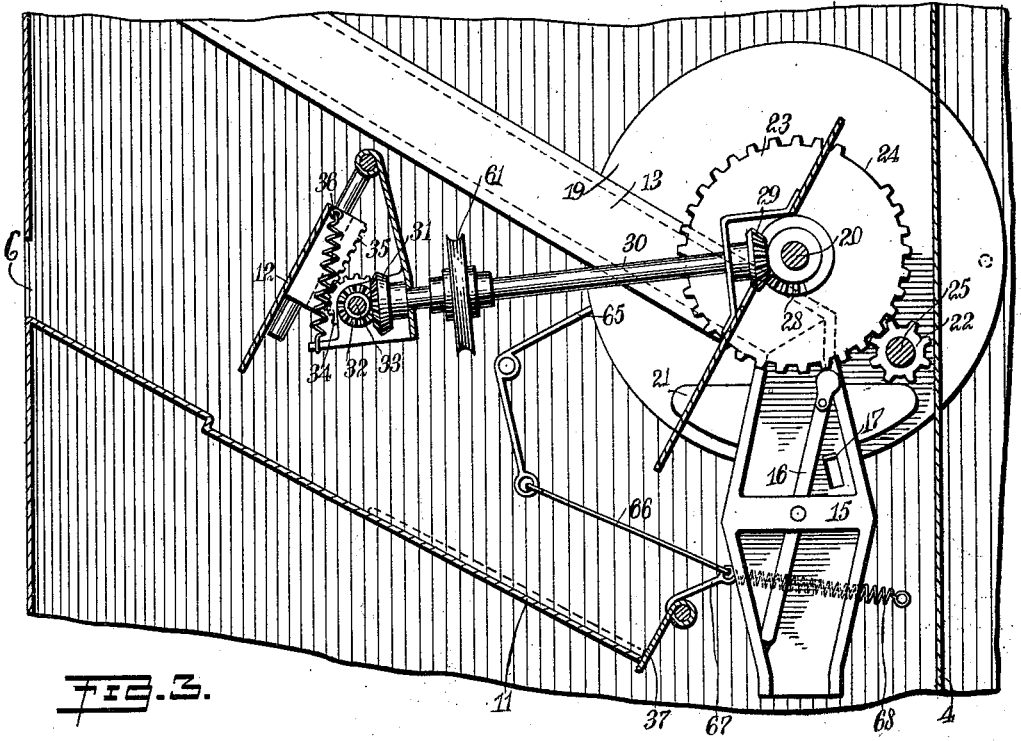
Figure 4:
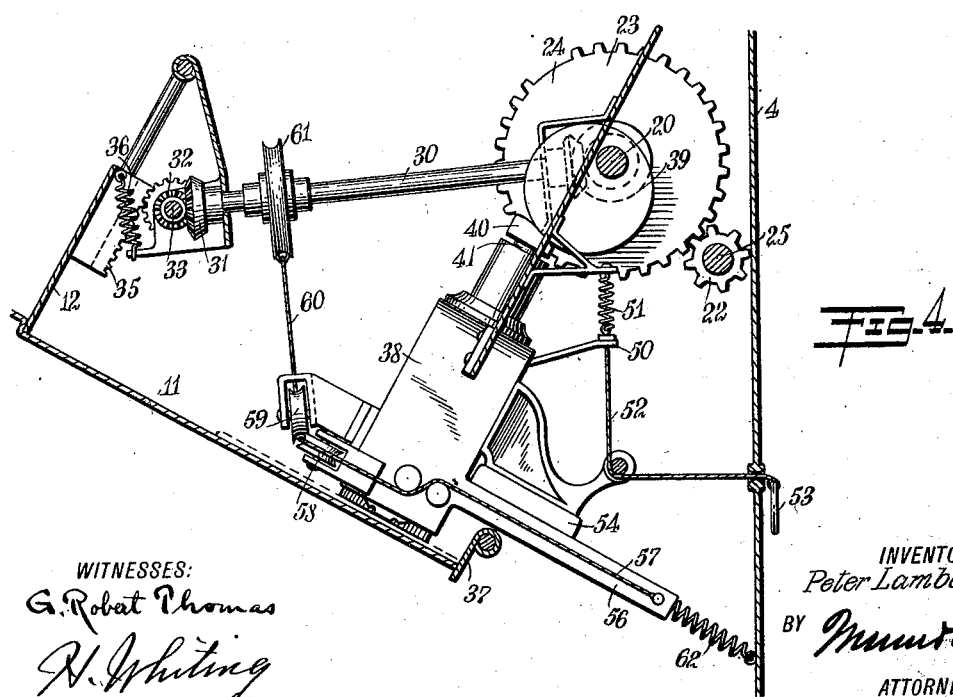
Figure 5:
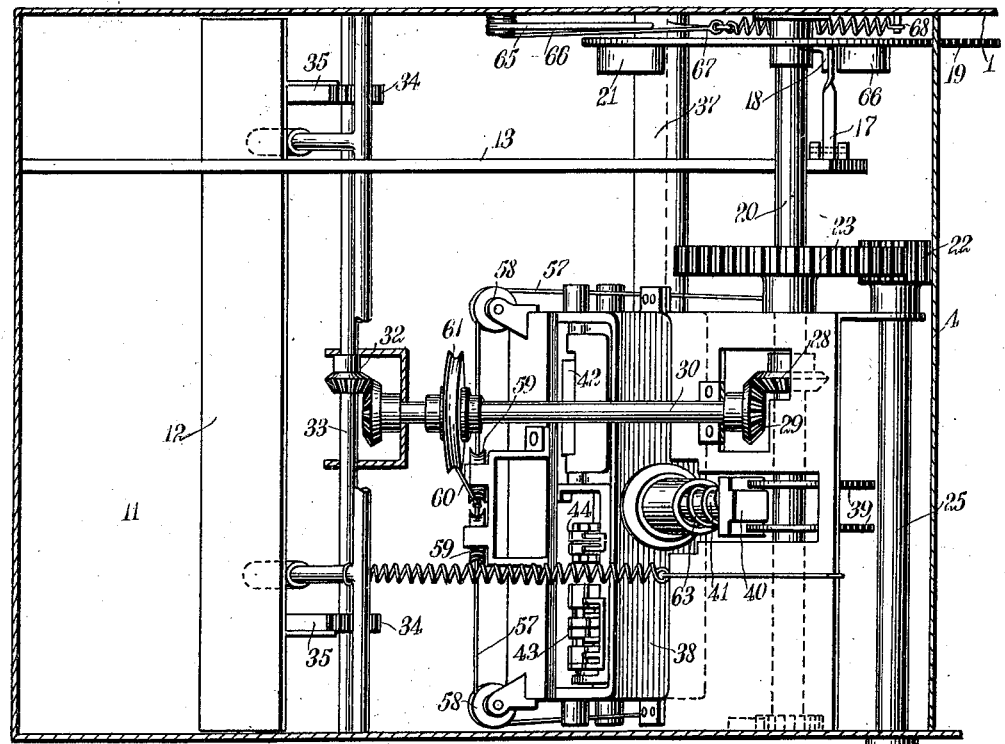
Figure 6:
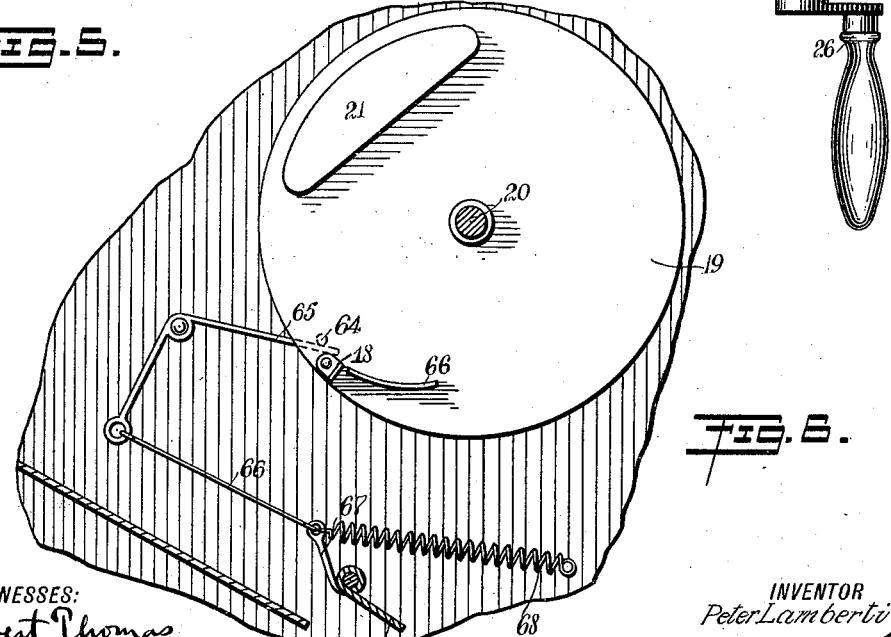

Figure 1 is a perspective view of a letter box having my device attached thereto, partly broken away to show the underlying structure; Fig. 2 is a fragmentary enlarged vertical section, showing the parts in position before a coin or check has been inserted in the machine; Fig. 3 is a view similar to Fig. 2, showing the parts in the position just after the correct number of coins has been inserted in the machine; Fig. 4 is an enlarged vertical section, showing the stamping mechanism in the act of impressing the inscription on the envelop; Fig. 5 is a horizontal section; Fig. 6 is an enlarged detail vertical section showing the means for operating the outlet gate, whereby the envelop with the inscription impressed thereon is permitted to drop into the receptacle portion of the letter box; Fig. 7 is an enlarged vertical section showing details of the stamping mechanism; Fig. 8 is an enlarged view in elevation, taken at right-angles to the view in Fig. 7, showing details of the stamping mechanism; Fig. 9 is a bottom plan view of the stamping mechanism; and Fig. 10 is a fragmentary view of an envelop, showing the nature of the stamp or inscription impressed thereon.

Referring more particularly to the separate parts of the device, 1 indicates a suitable mail-collecting device, such as a receptacle, which may be secured in any convenient locality, as for instance, by being attached to a lamp post. The device preferably is divided into two compartments 2 and 3 by any suitable means, such as a partition 4, illustrated in Fig. 1. The compartment 2 is for such envelops as have a stamp affixed thereto already by the person posting the same, and is provided with a communicating opening 5, permitting the letters to be inserted therein. The compartment 3 is connected in a manner to be described, to an inlet opening 6, in which the unstamped envelops are deposited.

Access may be had to the interior of the device 1 for the purpose of removing the letters, by means of a suitable door 7, which may be connected to the body of the device in any well known manner. Access may be had to the operating mechanism to be described, by means of a suitable door or closure 8, which is locked by any suitable form of lock, indicated at 9.

The letter slots or inlets 5 and 6 may have suitable inscriptions located in juxtaposition thereto, such as "Stamped letters" and "Unstamped letters". A further slot is provided, in juxtaposition to the slot 6, which is marked "Unstamped letters" for the purpose of inserting the required coins to actuate the device. In this case, a single slot is shown, indicated by the numeral 10, and has the inscription "Place two cents here" located in juxtaposition thereto. Any number of these slots may be provided for the purpose of stamping mail having had paid thereon various prices according to the weight, or for any other reason.

Coming now to the interior mechanism, and referring more particularly to Figs. 2, 3, 4 and 7, it will be seen that there is connected to the letter slot 6 an apron 11, access to the lower portion of which is barred by means of a gate 12, which is operated in a manner to be described. It will be further noted that connected with the slot 10, there is provided a chute 13, which extends downwardly, and is connected at its opposite end to a releasing mechanism 14, which consists of a frame 15 and a guard 16 pivotally connected to the frame 15 in any well known manner. In this particular instance, the mechanism is so operated that it will be controlled or actuated by the insertion of two separate pennies in the slot 10. The first penny which travels down the chute 13 reaches the guard 16 when in the position occupied in Fig. 2. When it strikes the lower portion of this guard, it acts as a wedge between the inner surface of the frame 15 and the left-hand surface of the guard 16, and forces it over into the dotted-line position indicated in Fig. 2. When in this position, the guard is removed from superposed relation with a trip latch 17, permitting the trip latch to be struck by the second penny coming down the chute 13. The second penny, after releasing the trip latch 17, strikes the lower end of the guard 16 and returns it to its original full-line position. The trip latch 17, in its normal locked position, engages a catch 18 on a rotary member 19, which is secured in any well known manner to a shaft 20. When the trip latch 17 engages the catch 18, it holds the rotary member 19 in the position indicated in Fig. 2, with a weight 21 on the rotary member held in an elevated position, so that as soon as the latch 17 is removed from engagement with the catch 18, the force of the weight 21, while tending to seek the lower level, will rotate the member 19 in a left-handed direction, thereby bringing into engagement with teeth on a pinion 22, teeth on a gear 23, secured in any well known manner to the shaft 20. This gear 23 is mutilated at 24; that is to say, it has a few of the teeth removed, so that when the latch 17 is in engagement with the catch 18, this mutilated portion will be in such a position as to the teeth on the gear 22 that the gear 23 cannot be operated thereby. The pinion 22 is secured to a shaft 25 in any well known manner, which extends outside of the casing of the receptacle 1, where it is provided with a suitable operating device, such as a hand crank 26, whereby the person posting a letter may operate the mechanism when once he has inserted the required amount of money, which in this case is two cents. Previous to the insertion of the two cents in the slot 10, the operator will have inserted the letter to be posted, in the slot 6, where it will have come in contact with the gate 12, thus having its further progress obstructed. When the member 19 is automatically rotated by the insertion of the two cents, the gate 12 will be simultaneously lifted to permit the further progress of the mail matter. This is done by providing on the shaft 20 a mutilated gear 27, which is provided with a sector of beveled teeth 28, adapted to be brought into engagement, by the initial rotation of the member 19, with a bevel gear 29 on a shaft 30. The shaft 30 is provided adjacent its opposite end with a bevel gear 31, which engages a corresponding bevel gear 32 on a transverse shaft 33. The shaft 33 is further provided with one or more gears 34, which mesh with one or more racks 35, secured to the gate 12 in any well known manner. It will thus be seen that the gate 12, which is slidingly mounted in the framework of the receptacle 1, will be elevated by the initial movement of the member 19. When the last tooth of the sector 28 passes the bevel gear 29, the gate 12 will be automatically returned to its closed position by any suitable means, such as a spring 36.

The mail matter, on its further travel down the apron 11, comes in contact with a door 37, which retains the mail matter in proper juxtaposition to a stamping or imprinting mechanism 38, more clearly illustrated in Figs. 4, 5, 7, 8 and 9, which will now be described. The further rotation of the member 23 by means of the crank 26, rotates one or more cam eccentrics 39, which are secured to the shaft 20 in any well known manner, and which engage a cam head 40 on a plunger 41. The plunger 41 has secured thereto in any well known manner a serial number impressor 42, comprising a plurality of numbered disks so arranged as to impress on each successive piece of mail matter a serial number different from the previous serial number. The exact mechanism of this serial number affixer is not a part of my invention, and may be of any suitable character, such as that described in the patent granted to E. G. Bates, Serial No. 789,113, May 2, 1905. Also connected to the plunger 41, there is provided a date impressor, indicated at 43, which includes members for indicating the month, the day of the month and the year. This mechanism may also be of any suitable character, such as that described in the patent to E. G. Bates, Serial No. 676,083, granted June 11, 1901. Also secured to the plunger 41, and preferably located intermediate the serial-number impressor 42 and the date impressor 43, there is provided a die 44, which, as will be seen by reference to Fig. 10, impresses the words "Two cents paid as per postage U. S." This die is further provided with an opening having a changeable disk 45, as more clearly illustrated in Fig. 9, having the town and the station thereon, and if necessary, the post-office box, whereby the exact location of the mailing of the letter may be determined. The disk 45 is further provided with a central opening 46, through which project a plurality of wheels 47, preferably two in number, which are adapted to extend flush with the surface of the die and disk and have inscribed thereon numerals corresponding to the twenty-four hours in the day, so that they will stamp the hour at which the letter is collected. This hour impressor, together with the date impressor, is provided with an advancing mechanism, whereby the letter carrier, at each collection, can advance the hour on the stamp to the next succeeding collection, and in case of the last collection for the day, to the next date. This mechanism is more clearly illustrated in Fig. 7, and consists of a pawl 48 adapted to engage a ratchet wheel 49 provided for each of the disks 47 and the date disks on the impressor 43. This pawl is pivotally connected to a lever 50, which is operated in one direction by a spring 51, and in the opposite direction by a flexible connection 52, which extends to a ring 53, the latter being adapted to be pulled by the postman when he desires to change the hour of the collection or the date of the collection. The desired stamp as affixed to the letter is more clearly illustrated in Fig. 10.

For the purpose of inking the various impressors, there is provided an inking pad 54, which is more clearly shown in Figs. 7 and 9. This inking pad 54 is so located that it will be engaged by one or more rollers 55, which are secured to a framework 56, when said framework is reciprocated in a manner to be described. The reciprocation of the framework 56 draws the rollers 55 across the ink pad 54 and then across the face of the lowermost characters on the impressors 42 and 43 and the die 44, thus inking them previous to the stamping action.

For the purpose of actuating the frame 56 previous to the downward movement of the plunger 41, there are provided a plurality of flexible connections 57, which extend over suitable guide pulleys 58 and 59 to a point where they are connected to a common flexible connection 60, which is secured in any well known manner to the periphery of a pulley 61, the latter being secured in any well known manner to the shaft 30. It will thus be seen that when the shaft 30 is rotated by the initial rotation of the member 19; that is to say, when the gate 12 is raised to permit the mail matter to fall farther down the apron 11, the pulley 61 is rotated so that it draws on the flexible connections 60 and 57, thereby advancing the rollers 55, first across the inking pad 54, and then across the face of the various stamping disks and dies.

When the last tooth on the sector 28 slips by the gear 29, the rollers 55 will be automatically returned out of the way by means of one or more springs 62, which are secured to the frame 56 in any well known manner. When, on continued rotation of the shaft 20, the thickest portion of the eccentric cam 39 has been returned to its original position, the plunger 41 will be automatically raised to its uppermost position by any suitable means, such as a spring 63. During this raising operation, the serial-number impressor 42 will be automatically changed as described in the patent to Bates, Serial No. 789,113, above-mentioned, to bring up the next member, so that the next piece of mail matter will be impressed with the next highest number in the series. Before the crank 26 has completed its revolution, and thus before the rotatable member 19 has been returned to its original position, a pin 64 on the member 19 will have come in engagement with one arm of a bell-crank-lever 65, to the other arm of which is connected, by any suitable means such as the connecting rod 66, an arm 67 on the door 37, so that the continued rotation of the member 19 will open the door 37, permitting the mail matter to drop into the compartment 3 in the letter box. When the pin 64 slips off the end of the bell-crank-lever 65, the door 37 is automatically closed by means of a spring 68. By the further rotation of the member 19, the trip latch 17 will be caught by a cam guide 66 on the member 19 and automatically depressed into engagement with the catch 18, so that it will lock the member 19 in its original set position, preventing the operation of the weight 21.

The operation of the device will be readily understood when taken in connection with the above description. When a person is provided with the ordinary stamps and has affixed the same to the mail matter, the latter can be dropped into the receptacle through the slot 5. If, however, a person is not provided with stamps, it is merely necessary to insert the unstamped mail matter through the slot 6, where it will be held temporarily on the apron 11 by the gate 12. Two pennies are inserted successively into the slot 10, from whence they travel down the chute 13 to the controlling mechanism 14. The first penny shifts the guard 16 from the full line position indicated in Fig. 2 to the dotted-line position, thereby exposing the trip latch 17, so that the second penny, as it comes down, will hit the end of the latch, raising the inner end out of engagement with the catch 18 on the rotatable member 19. This permits the weight 21 to rotate the member 19 a sufficient distance to remove the mutilated portion 24 of the gear 23 from juxtaposition to the pinion 22 and bring the teeth on the gear 23 into engagement with the teeth on the pinion 22. This rotation is also sufficient to rotate the shaft 30 enough to raise the gate 12, and thus permit the mail matter to travel farther along the apron until it is stopped by the door 37. This same movement of the shaft 30 rotates the pulley 61, causing it to draw in on the flexible connections 57 and 60, thereby advancing the rollers 55 across the face of the ink pad 54, and also across the faces of the various character-impressing disks and dies, so that the latter will be properly inked. When the last gear of the mutilated sector 28 is slipped off the bevel gear 29, the gate 12 will be automatically closed by the spring 36, and the inking rollers 55 will be automatically withdrawn by the springs 62. The person mailing the letter may then further rotate the member 19 by means of the crank 26, so that the stamping plunger 41 will be forced downwardly against the tension of the spring 63, until the various impressors carried by the plunger come in contact with the mail matter, located as indicated by the dotted-lines in Fig. 4, whereby said mail matter will be impressed with a stamp similar to that illustrated in Fig. 10. It will be seen by reference to Fig. 10, that this stamp includes a serial number, the date of collection, the hour of collection, and the city, State and station at which the letter was collected, together with an inscription stating that the required amount of postage has been paid. Further rotation of the crank 26 will withdraw the eccentric portion of the cam 39 from engagement with the head 40 on the plunger 41, so that the plunger 41, together with the impressors carried thereby, will be automatically permitted to return by the force of the spring 63. During the continued rotation of the shaft 26 and the member 19, the pin 64 on the member 19 will come into engagement with the bell-crank-lever 65, thereby opening the door 37, permitting the mail matter to drop into the compartment 3 reserved for the letters with the serial number stamped thereon. Continued rotation of the member 19 permits the pin 64 to slip off the end of the bell crank lever 65, thereby permitting the door 37 to be automatically closed by the spring 68. Further movement of the member 19 brings the cam guide 66 into engagement with the trip latch 17, bringing it into locking engagement with the catch 18, so that the parts are automatically set for another operation. When the postman collects the mail deposited in the receptacle, he holds one of the rings 53 so as to actuate one of the levers 50, thereby advancing the disks indicating the hour of collection and the time of collection next succeeding. He also pulls another lever, if it is at the end of the day, so that the date-impressor 43 is actuated to bring up the next succeeding date.

It will thus be seen that there is provided a simple and efficient means whereby a letter may be stamped as having the required amount of postage paid thereon, without the necessity of affixing a gummed stamp in an unsanitary manner. It will, further, be a great saving to the post-office department, in that it will diminish the number of clerks necessary to sell stamps.

Because of the fact that each letter has a distinct serial number, the chance of robbing the post-office department of the postage money inserted in the letter box is practically rendered impossible, because of the fact that the postman has to account for each letter in the series. This, further, eliminates the feature of having the mail matter itself stolen or tampered with, because of the fact that the responsibility for the pilfering can be almost instantaneously set, by having the station, the town, and a given serial number impressed on the letter.

While I have shown one embodiment of my invention, I do not wish to be limited to the specific details thereof, but desire to be protected in various changes, modifications and alterations which I may make within the scope of the appended claims.

Having thus described my invention, I claim as new and desire to secure by Letters Patent:—

1. In an apparatus of the character described, the combination with a stamp imprinting device, of operating means for said stamp imprinting device and including a rotatable weighted shaft provided with means for engaging the said device, and a lock for said rotatable weighted shaft.

2. In an apparatus of the character described, the combination with a stamp imprinting device, of operating means for said stamp imprinting device and comprising a shaft mounted to turn and provided with means for engaging and actuating the stamp imprinting device, a weighted member for turning said shaft, and a lock for said weighted member, said stamp imprinting device being adapted to impress on successive pieces of mail matter, successive serial numbers, each number differing from the juxtaposed number.

3. In an apparatus of the character described, the combination with a stamp imprinting device, of operating means for said stamp imprinting device and comprising a shaft mounted to turn, a rotatable operating member provided with means for rotating the shaft, the said shaft and operating member being normally operatively disconnected, a weight on said shaft, for turning the same to bring the shaft into operative connection with the operating member, and a lock for said operating means, said stamp imprinting device being adapted to impress on pieces of mail matter the time of collection.

4. In an apparatus of the character described, the combination with a stamp-imprinting device having a plunger, of operating means for engaging the plunger of said stamp-imprinting device, and comprising a shaft mounted to turn, a rotatable operating member provided with means for rotating said shaft, the shaft and operating member being normally operatively disconnected, a lock for said shaft, and a weight for turning said shaft to move the same into operative connection with said operating member, said stamp-imprinting device being adapted to impress on pieces of mail matter an inscription stating that the required postage has been paid.

5. In an apparatus of the character described, the combination with a stamp-imprinting device having a plunger, of operating means for said stamp-imprinting device, and comprising a shaft mounted to turn and provided with means for engaging the plunger, and an operating member for said shaft, and a lock for said operating means, the said shaft and operating member being normally held operatively disconnected by said lock, and means for turning the shaft when the lock is released to move the shaft into operative connection with the operating member, said stamp-imprinting device being adapted to impress on articles of mail matter a serial number, the time and date of collection, and an inscription stating that the required postage has been paid.

6. In an apparatus of the character described, the combination with a mail-receiving apron, of a stamping device coöperating with said apron for imprinting an inscription on mail matter, a shaft mounted to turn, means for operating said stamping device from said shaft, an operating member for said shaft mounted to turn, the shaft and operating member being normally operatively disconnected, and a weight for turning the shaft to move the same into operative connection with said operating member.

7. In an apparatus of the character described, the combination with a mail-receiving apron, of a stamping device coöperating with said apron, for imprinting an inscription on mail matter, mechanism for operating said stamping device and comprising a shaft mounted to turn and provided with means for engaging and actuating the stamping device, an operating member for said shaft, and a weighted member carried by said shaft, and means operated by said mechanism for controlling the passage of mail matter on said apron.

8. In an apparatus of the character described, the combination with a mail receiving apron, of a stamp imprinting device arranged in coöperative relation with said apron and adapted to imprint an inscription on articles of mail matter, means for operating said device and comprising a rotatable member and an operating member for the rotatable member, a locking device for the rotatable member to normally hold said member out of coöperative relation with the operating member, a weight for turning the rotatable member when released from the locking device to bring the said member into operative connection with the operating member, a normally closed door for positioning said mail matter on said apron in proper juxtaposition to said stamp imprinting device, and means for opening said door and operated by the said rotatable member.

9. In an apparatus of the character described, the combination with a mail receiving apron, of a stamp imprinting device arranged in coöperative relation with said apron, means for operating said device and including a rotatable member, an operating member for the rotatable member mounted to turn, a lock for normally holding the rotatable member out of coöperative relation with the operating member, a weight carried by the said rotatable member for moving the same into operative connection with the operating member, one or more gates or doors for controlling the passage of mail matter along said apron, and mechanism for operating said gates or doors and controlled from said rotatable member.

10. In an apparatus of the character described, the combination with a mail receiving apron, of a stamp imprinting device, mechanism for operating said stamp imprinting device, and including a shaft, a weighted member on said shaft, and a rotatable operating member for said shaft, and means for controlling the passage of mail matter along said apron and operated by said mechanism.

11. In an apparatus of the character described, the combination with a support for mail matter, of a stamp imprinting device including a plunger, and adapted to imprint an inscription on mail matter on said support, a rotatable member, mechanism for actuating the plunger from said rotatable member, a rotatable operating member for said rotatable member, said rotatable member and said operating member being normally operatively disconnected, and means for bringing said rotatable member into coöperative relation with said operating member.

12. In an apparatus of the character described, the combination with a support for mail matter, of a stamp-imprinting device including a plunger, and adapted to imprint an inscription on mail matter, on said support, mechanism for operating said plunger, said mechanism comprising a rotatable member, an operating member for said rotatable member, the operating member being mounted to turn, said rotatable member and said operating member being 13. In an apparatus of the character described, the combination with a support for mail matter, of a stamp-imprinting device, including a plunger and adapted to imprint an inscription on mail matter, on said support, a rotatable member means for actuating the plunger of the stamp imprinting device from said rotatable member, an operating member for said rotatable member, said rotatable member and said operating member being normally operatively disconnected, means for bringing said rotatable member into coöperative connection with said operating member, a latch for locking said members out of coöperative relation, and a guard for said latch.

14. In an apparatus of the character described, the combination with a mail apron, of a stamp imprinting device, a sliding gate for controlling the passage of mail matter along said apron, mechanism for operating said stamp imprinting device, said mechanism including a rotatable member, a rack on said sliding gate, a shaft provided with a gear in mesh with said rack, and means for turning the shaft from said rotatable member to raise the sliding gate.

15. In an apparatus of the character described, the combination with a mail receiving apron, of a stamp imprinting device, a door for positioning said mail matter on said apron in proper relation to said imprinting device, mechanism for operating said stamp imprinting device and including a rotatable member, and means actuated by the rotatable member for operating said door, the said means including a bell crank lever having one arm connected with an arm on the door, and a projection on the rotatable member for engaging the other arm of said lever to move the same to open said door, and a spring for closing said door when the said projection leaves the arm of the bell crank lever.

16. In an apparatus of the character described, the combination with a support for mail matter, of a stamp-imprinting device provided with a plunger, a shaft mounted to turn and provided with means for engaging the plunger, an operating member for said shaft mounted to turn, the shaft and said operating member being normally operatively disconnected, means connected with the shaft for moving the latter into operative connection with the operating member, means for controlling the passage of mail matter along said support, and means for inking said stamp-imprinting device.

17. In an apparatus of the character described, the combination with a mail receiving apron, of a stamp-imprinting device having a plunger, a shaft mounted to turn and provided with a cam for engaging the said plunger, an operating member for said shaft, the said operating member being mounted to turn, the shaft being normally held out of operative connection with the operating member, means for turning said shaft to move the same into operative connection with said operating member, and means for controlling the passage of mail matter along said apron.

18. In an apparatus of the character described, the combination with a mail receiving apron, of a stamp-imprinting device having a plunger, a shaft mounted to turn and provided with a cam for engaging the said plunger, a mutilated gear on said shaft, an operating member mounted to turn and provided with a pinion, the said mutilated gear being normally held out of operative connection with the pinion, a weighted member secured to said shaft to turn the same to move the mutilated gear into operative connection with said pinion, and means for inking said stamp imprinting device and operated from the said shaft.

19. In an apparatus of the character described, the combination with a mail receiving apron, of a stamp imprinting device having a plunger, a shaft mounted to turn and provided with a cam for engaging the said plunger, a mutilated gear on said shaft, an operating member mounted to turn and provided with a pinion, the said mutilated gear and pinion being normally operatively disconnected, a weighted member secured to said shaft and adapted to turn the same to bring the mutilated gear into operative connection with the pinion, means for locking the said weighted member in position to hold the said gear and pinion operatively disconnected, means for controlling the passage of mail matter along said apron, and means for inking said stamp-imprinting device and operated from the said shaft.

20. In an apparatus of the character described, the combination with a support for mail matter, of a stamp-imprinting device adapted to imprint an inscription on mail matter on said support, the said stamp-imprinting device including a plunger, mechanism for operating said device, comprising a shaft mounted to turn and provided with means for engaging the plunger, an operating member for said shaft, the said shaft and said operating member being normally operatively disconnected, and a weighted member on said shaft for moving the same into operative connection with the operating member.

21. In an apparatus of the character described, the combination with a support for mail matter, of a stamp-imprinting device provided with a plunger, a shaft mounted to turn and provided with means for engaging the plunger to operate the said stamp-imprinting device, a member secured on said shaft and provided with a weight, the said member being normally held with the weight in an elevated position, a mutilated gear on said shaft, an operating shaft provided with means for turning the same, a pinion on said operating shaft, for engagement with the teeth of the mutilated gear to rotate the first mentioned shaft, the said mutilated gear and pinion being operatively disconnected when the said weighted member is held in its normal position, the said weighted member being adapted when released to turn the said shaft to bring the mutilated gear into operative connection with the pinion.

22. In an apparatus of the character described, the combination with a support for mail matter, of a stamp imprinting device, operating means for said stamp-imprinting device comprising a rotatable member, and an operating member for the rotatable member, a lock for the rotatable member to normally hold said member out of coöperative relation with the operating member, means for turning the rotatable member when released from the lock to bring the said member into operative connection with the operating member, a gate for controlling the passage of mail matter along said support, and mechanism for actuating the gate, the said mechanism being operated from the said rotatable member while the latter is moving into operative connection with the said operating member.

23. In an apparatus of the character described, the combination with a support for mail matter, of a stamp-imprinting device, operating means for said stamp-imprinting device comprising a rotatable member and an operating member for the rotatable member, a lock for the rotatable member to normally hold said member out of coöperative relation with the operating member, means for turning the rotatable member when released from the lock, to bring the said member into operative connection with the operating member, and means for inking said stamp-imprinting device, the said means being operated from the rotatable member while the latter is moving into operative connection with said operating member.

24. In an apparatus of the character described, the combination with a support for mail matter, of a stamp-imprinting device, operating means for said stamp-imprinting device comprising a rotatable member and an operating member for the rotatable member, a lock for normally holding the rotatable member out of coöperative relation with the operating member, means for turning the rotatable member when released from the lock to bring the said member into operative connection with the operating member, a gate for controlling the passage of mail matter along said support, and means for inking said stamp-imprinting device, the said gate and the said inking means being operated from the said rotatable member while the latter is moving into operative connection with the said operating member.

In testimony whereof I have signed my name to this specification in the presence of two subscribing witnesses.

PETER LAMBERTI.

Witnesses:
HORATIO WHITING,
PHILIP D. ROLLHAUS.

Copies of this patent may be obtained for five cents each, by addressing the "Commissioner of Patents, Washington, D. C."